US011123846B2

(12) United States Patent
Koizumi et al.

(10) Patent No.: US 11,123,846 B2
(45) Date of Patent: Sep. 21, 2021

(54) ELECTRIC TOOL

(71) Applicant: Hitachi Koki Co., Ltd., Tokyo (JP)

(72) Inventors: Toshiaki Koizumi, Ibaraki (JP); Takuya Yoshinari, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 353 days.

(21) Appl. No.: 15/314,098

(22) PCT Filed: May 22, 2015

(86) PCT No.: PCT/JP2015/064752
§ 371 (c)(1),
(2) Date: Nov. 28, 2016

(87) PCT Pub. No.: WO2015/182507
PCT Pub. Date: Dec. 3, 2015

(65) Prior Publication Data
US 2017/0190027 A1     Jul. 6, 2017

(30) Foreign Application Priority Data

May 30, 2014   (JP) .............................. JP2014-111990

(51) Int. Cl.
*B25B 21/02*   (2006.01)
*B25B 21/00*   (2006.01)
(Continued)

(52) U.S. Cl.
CPC ............ *B25B 21/026* (2013.01); *B25B 21/00* (2013.01); *B25C 5/15* (2013.01); *B25F 5/00* (2013.01); *H02J 7/345* (2013.01)

(58) Field of Classification Search
CPC ......... B25B 21/00; B25B 21/026; B25C 5/15; H02J 7/345
(Continued)

(56) References Cited

U.S. PATENT DOCUMENTS 4,039,965 A * 8/1977 Ishii ...................... H03F 3/3091
330/149
7,403,370 B2 * 7/2008 Oi .......................... H01G 4/232
361/306.2
(Continued)

FOREIGN PATENT DOCUMENTS

JP     S52-140077     10/1977
JP     H08322253      12/1996
(Continued)

OTHER PUBLICATIONS

Definition of term "Substrate", retrieved from URL https://www.yourdictionary.com/substrate on Oct. 29, 2019 (Year: 2019).*
(Continued)

*Primary Examiner* — Valentin Neacsu
(74) *Attorney, Agent, or Firm* — JCIPRNET (57) ABSTRACT

In order to provide an electric tool such that the capacitances of noise-suppressing film capacitors can be increased without increasing the diameter of a handle section, the housing of the electric tool comprises: a body section that stores a brushless motor, a striking mechanism part, and a portion of an output part; a handle section, whose one end is connected to the body section; and a storage section that is formed on the other end of the handle section. A pair of film capacitors for removing noise generated from an inverter circuit are mounted on a capacitor substrate and stored side by side inside the handle section. The film capacitors are connected in parallel with each other, thereby providing a capacitor having a larger total capacitance than before.

20 Claims, 7 Drawing Sheets

(51) Int. Cl.
  *B25C 5/15* (2006.01)
  *H02J 7/34* (2006.01)
  *B25F 5/00* (2006.01)

(58) Field of Classification Search
  USPC .......................................... 173/217; 174/260
  See application file for complete search history.

(56) References Cited

U.S. PATENT DOCUMENTS

| | | | | |
|---|---|---|---|---|
| 2002/0007908 | A1* | 1/2002 | Mamada | H05K 1/181 |
| | | | | 156/293 |
| 2003/0081393 | A1* | 5/2003 | Yokoyama | H05K 1/0271 |
| | | | | 361/767 |
| 2006/0197184 | A1* | 9/2006 | Oi | H01G 4/232 |
| | | | | 257/532 |
| 2008/0316678 | A1* | 12/2008 | Ehrenberg | H01G 9/058 |
| | | | | 361/503 |
| 2010/0033938 | A1* | 2/2010 | Kitagawa | H05K 1/0231 |
| | | | | 361/748 |
| 2012/0319625 | A1* | 12/2012 | Thomas | H02P 27/06 |
| | | | | 318/51 |
| 2013/0000934 | A1* | 1/2013 | Tadokoro | B25B 21/00 |
| | | | | 173/20 |
| 2013/0240766 | A1* | 9/2013 | Teramoto | F16K 31/0675 |
| | | | | 251/129.15 |
| 2014/0022678 | A1* | 1/2014 | Maile | H02H 3/20 |
| | | | | 361/56 |
| 2014/0332261 | A1* | 11/2014 | Fujimoto | H01G 4/30 |
| | | | | 174/260 |
| 2014/0367827 | A1* | 12/2014 | Lee | H01L 23/5223 |
| | | | | 257/532 |
| 2015/0111480 | A1* | 4/2015 | Vanko | B25F 5/008 |
| | | | | 451/359 |
| 2015/0288259 | A1* | 10/2015 | Koizumi | B25F 5/02 |
| | | | | 173/170 |

FOREIGN PATENT DOCUMENTS

| | | |
|---|---|---|
| JP | 2001128432 | 5/2001 |
| JP | 2007-215385 | 8/2007 |
| JP | 2011-148069 | 8/2011 |
| JP | 2012-139747 | 7/2012 |
| JP | 2012-239380 | 12/2012 |
| JP | 2014-069254 | 4/2014 |
| WO | 2014069369 | 5/2014 |

OTHER PUBLICATIONS

Definition of "circuit board" by Dictionary.com. Retrieved from URL https://www.dictionary.com/browse/circuit-board on Mar. 31, 2020 (Year: 2020).*

"International Search Report (Form PCT/ISA/210)", dated Jul. 21, 2015, with English translation thereof, pp. 1-4.

* cited by examiner

ELECTRIC TOOL

CROSS-REFERENCE TO RELATED APPLICATION

This application is a 371 application of the international PCT application serial no. PCT/JP2015/064752, filed on May 22, 2015, which claims the priority benefit of Japan application no. 2014-111990, filed on May 30, 2014. The entirety of the abovementioned patent applications is hereby incorporated by reference herein and made a part of this specification.

BACKGROUND OF THE INVENTION

Field of the Invention

The invention relates to an electric tool operable by using electric power supplied from an alternate current power source.

Description of Related Art

Some electric tools are driven by electric power supplied to a commutator motor by an external alternate current power source, such as a commercial power source. An impact driver, for example, is known as this kind. In addition, an electric tool described in the following is already proposed in Patent Literature 1, for example. Specifically, a brushless motor is used as motor, and a microcomputer mounted to a control substrate may be used to delicately control a rotation speed of the brushless motor.

PRIOR ART LITERATURE

Patent Literature

Patent Literature 1: Japanese Patent Publication No. 2012-139747

Figure 9:
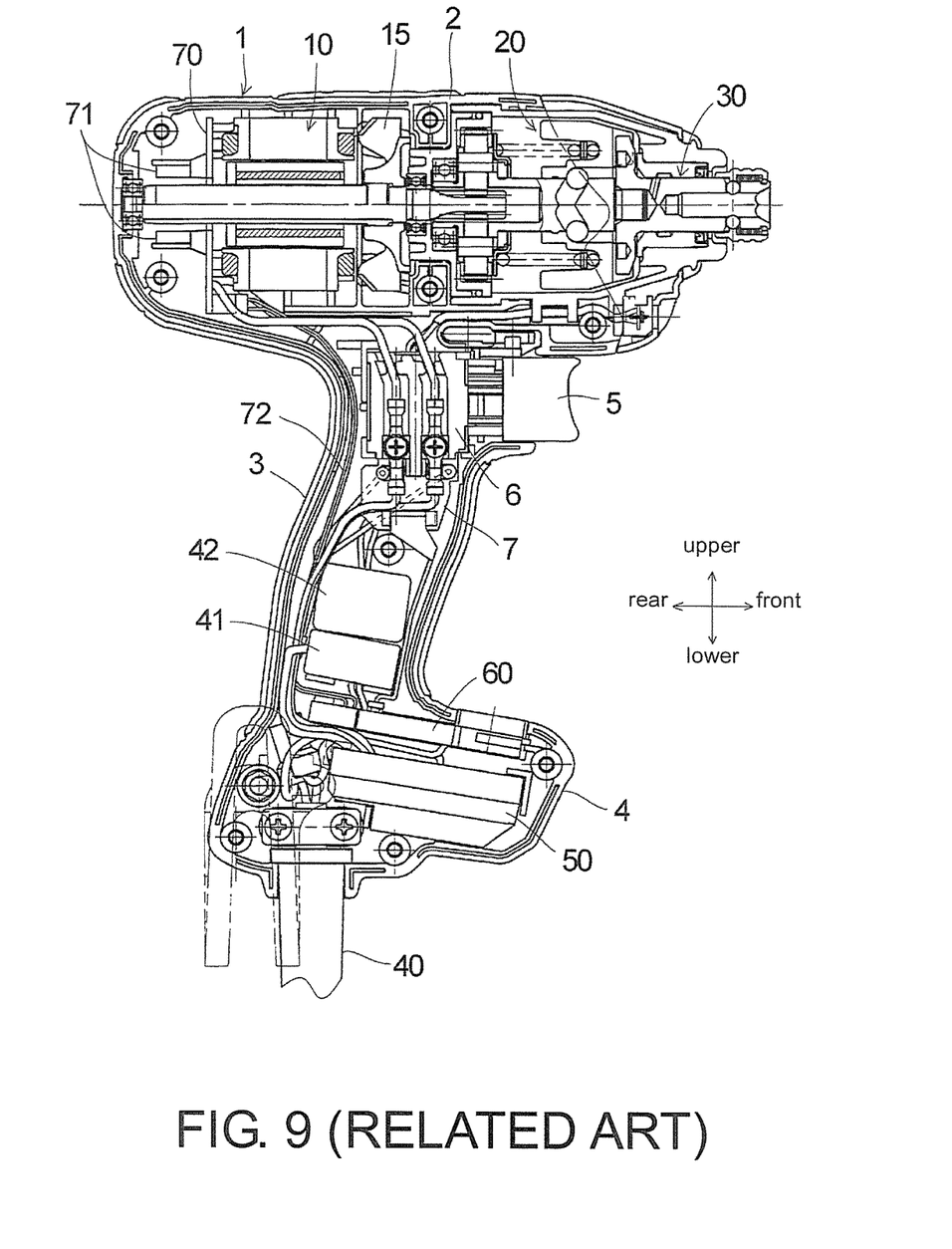
FIG. 9 is a cross-sectional side view illustrating an electric tool shown in Patent Literature 1.

FIG. 9 is a cross-sectional side view illustrating an electric tool shown in Patent Literature 1. The electric tool is an impact driver and has a housing 1, a brushless motor 10, a striking mechanism part 20 rotating by using the brushless motor 10, and an output part 30 connected to the striking mechanism part 20. In the figure, upper, lower, front, and rear directions are defined.

The housing 1 includes: a body section 2 that stores the brushless motor 10, the striking mechanism part 20, and a portion of the output part 30; a handle section 3, whose one end is connected to the body section 2; and a storage section 4, formed on the other end of the handle section 3. A trigger 5 is disposed in the handle section 3. The trigger 5 is connected to a switch mechanism 6 stored in the handle section 3. The user may turn on and off the electric power supplied to the brushless motor 10 by using the trigger 5.

A power cord 40 is drawn out from a lower part of the storage section 4. A power box 50 stored in the storage section 4 is connected to the power cord 40. A rectifier circuit substrate is disposed in the power box 50. A rectifier circuit converting an alternate current input through the power cord 40 into a direct current is mounted to the rectifier circuit substrate. The storage section 4 also stores a control circuit substrate 60. A control circuit that controls, for example, rotation of the brushless motor 10 is mounted to the control circuit substrate 60. A ferrite core 41, as a noise filter, is inserted between the power cord 40 and the rectifier circuit. In addition, the ferrite core 41 is stored in the handle section 3. Besides, a film capacitor 42 configured to remove noise generated from an inverter circuit is stored side by side with the ferrite core 41 in the handle section 3.

The inverter circuit controlled by the control circuit is mounted to an inverter circuit substrate (switch element substrate) 70 behind the brushless motor 10. The inverter circuit has insulated gate bipolar transistors (IGBTs) 71. The IGBTs 71 are, for example, six switch elements serving to turn on and off power supply to the brushless motor 10. The respective IGBTs 71 are cooled off with an air flow generated by a cooling fan 15 rotating with the brushless motor 10. The control circuit includes a driving circuit (gate driver) outputting driving signals that turn on and off the respective IGBTs 71 and a microcomputer. The control circuit substrate 60 and the inverter circuit substrate 70 are electrically connected by a cable 72.

SUMMARY OF THE INVENTION

As the output of electric tools becomes higher, the noise voltage generated from an inverter circuit also tends to increase. Therefore, the capacitance of the film capacitor 42 configured to remove the noise generated from the inverter circuit needs to be increased. However, if one film capacitor is adopted for a larger capacitance, an internal space of the handle section needs to be enlarged, thus making a diameter of the handle section greater.

In consideration of such consequence, the invention is accomplished in order to provide an electric tool with a noise-suppressing film capacitor having an increased capacitance even if the diameter of the handle section is not increased.

A mode of the invention provides an electric tool operable by using power supplied from an alternate current power source. The electric tool includes: a motor; an inverter circuit, driving the motor; a rectifier circuit, outputting a voltage supplied to the inverter circuit; and two non-polar capacitors, connected in parallel between output terminals of the rectifier circuit.

It is also preferable that the non-polar capacitors are both film capacitors.

It is also preferable that the two non-polar capacitors are mounted to a common substrate, two lead wires extend from the substrate, one end of one of the lead wires is connected to one ends of the two non-polar capacitors, one end of the other of the lead wires is connected to the other ends of the two non-polar capacitors, and the other ends of the lead wires are connected to the rectifier circuit.

It is also preferable that the electric tool includes a housing, the housing has a body section storing the motor, and a handle section whose one end is connected to the body section, and the non-polar capacitors are stored in the handle section.

It is also preferable that the housing has a storage section disposed to the other end of the handle section, a power cord is drawn out from the storage section, and the rectifier circuit is stored in the storage section.

It is also preferable that the electric tool includes choke coils. The choke coils are respectively disposed to a power input line connected to the rectifier circuit, and the plurality of choke coils are stored in the storage section.

It is also preferable that the electric tool includes a housing. The housing has a body section storing the motor, a handle section whose one end is connected to the body section, and a storage section disposed to the other end of the handle section. The two non-polar capacitors are stored in the storage section, and choke coils respectively disposed to a power input line connected to the rectifier circuit are stored in the handle section.

Another mode of the invention provides an electric tool operable by using power supplied from an alternate current power source. The tool includes: a motor; a housing, having a body section storing the motor, a handle section whose one end is connected to the body section, and a storage section disposed to the other end of the handle section; an inverter circuit, driving the motor; a rectifier circuit, outputting a voltage supplied to the inverter circuit; a non-polar capacitor, connected between output terminals of the rectifier circuit; and choke coils, respectively disposed to a power input line connected to the rectifier circuit. One of the non-polar capacitor and the choke coils are stored in the handle section, and the other of the non-polar capacitor and the choke coils are stored in the storage section.

In the meantime, any combination of the above forming elements and a method, a system and the like converted from the expression of the invention are also effective as the modes of the invention.

The invention provides an electric tool with a noise-suppressing capacitor film having an increased capacitance even if the diameter of the handle section is not increased.

DESCRIPTION OF THE EMBODIMENTS

In the following, the preferred embodiments of the invention are described in detail with reference to the accompanying drawings. Same or equivalent forming elements, components, and the like shown in the respective figures are marked with the same reference symbols. In addition, repeated descriptions are appropriately omitted. Also, the embodiments merely serve as examples without limiting the invention. All the features or combinations thereof described in the embodiments are not necessarily the essence of the invention.

Embodiment 1

Figure 1:
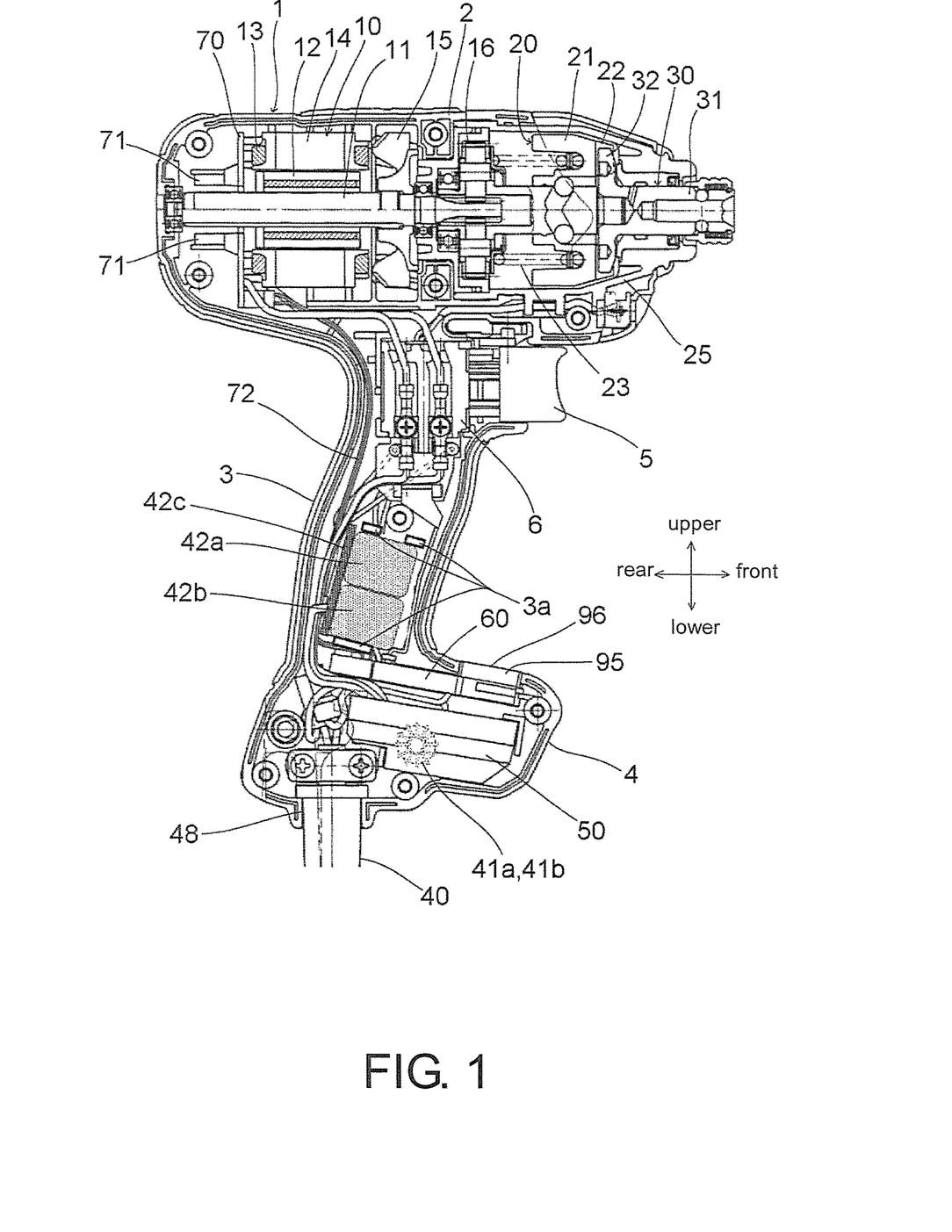
FIG. 1 is a cross-sectional side view illustrating an electric tool of Embodiment 1 of the invention.
Figure 2:
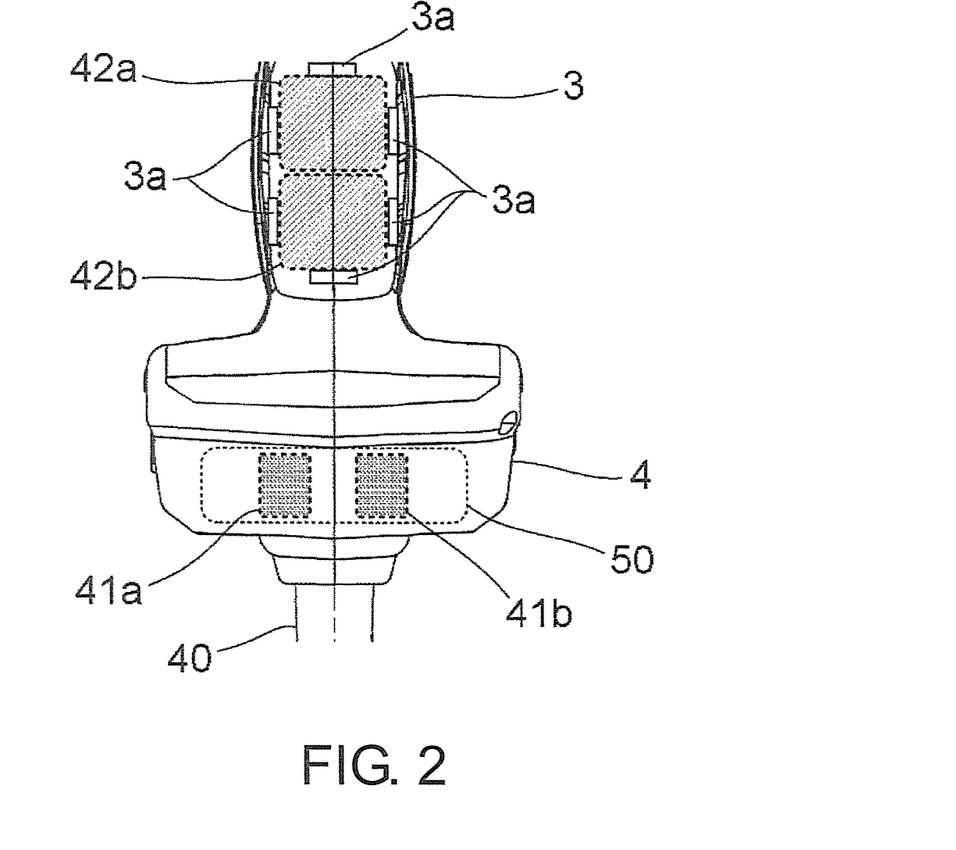
FIG. 2 is a front view of essential parts of the electric tool shown in FIG. 1 obtained by cutting a portion of a handle section 3.
Figure 3:
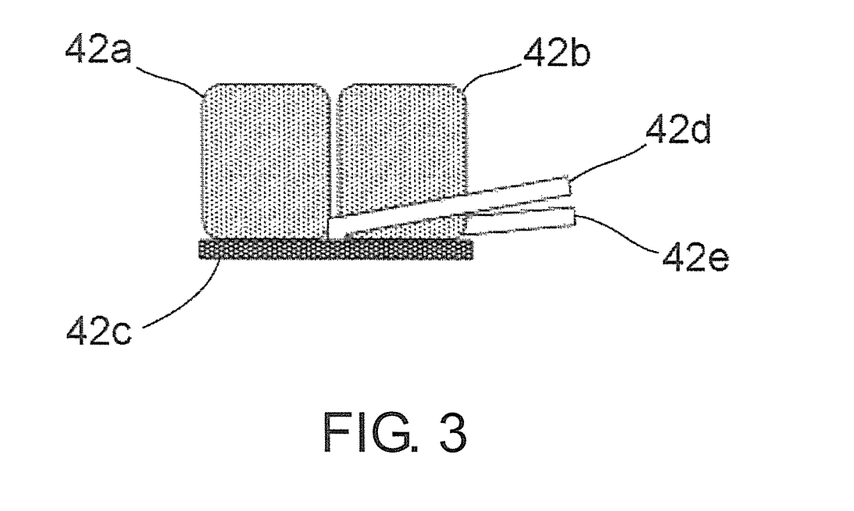
FIG. 3 is a view illustrating an appearance of a set of film transistors of the electric tool shown in FIG. 1.

FIG. 1 is a cross-sectional side view illustrating an electric tool of Embodiment 1 of the invention. In FIG. 1, upper, lower, front, and rear directions are defined. FIG. 2 is a front view of essential parts of the electric tool shown in FIG. 1 obtained by cutting a portion of the handle section 3. FIG. 3 is a view illustrating an appearance of a set of film transistors of the electric tool shown in FIG. 1. The electric tool of the embodiment is an impact driver. A housing 1 includes: a body section 2 that stores a brushless motor 10, a striking mechanism part 20, and a portion of an output part 30; a handle section 3 whose one end is connected to the body section 2; and a storage section 4 formed on the other end of the handle section 3.

The brushless motor 10 has: an output axle 11 extending along the front-rear direction; a rotor 12 fixed to the output axle 11 and having a plurality of permanent magnets; a stator 14 disposed to surround the rotor 12 and having a plurality of stator coils 13; and a cooling fan 15 that is fixed to the output axle 11. Two sides of the output axle 11 are axially supported (supported by a bearing), and the stator 14 is fixed to the body section 2 of the housing 1. Rotation of the output axle 11 is decelerated by a pinion gear mechanism 16 and provided to a hammer 21 of the striking mechanism part 20.

The striking mechanism part 20 has the hammer 21 disposed in a hammer case 25 and a spring 23 that urges the hammer 21 toward the front direction. A tip of the hammer 21 has a colliding part 22 and is rotationally driven by an output axle of the pinion gear mechanism 16. A collided part 32 is provided at a rear end of an anvil 31 that constitutes the output part 30. The spring 23 urges the hammer 21 toward the front direction by means that the colliding part 22 collides with the collided part 32 in a rotation direction when the hammer 21 rotates. According to the configuration, the hammer 21 provides a rotational striking force to the anvil 31 of the output part 30 when the hammer 21 rotates. In addition, the hammer 21 is configured to be also capable of resisting the force urged by the spring 23 and moving toward the rear direction. After the collision of the colliding part 22 and the collided part 32, the hammer 21 resists the force urged by the spring 23, and rotates while retracting. Moreover, if the colliding part 22 passes the collided part 32, an elastic energy stored in the spring 23 may be released and the hammer 21 may move toward the front direction, and the colliding part 22 and the collided part 32 may collide again. The anvil 31 constituting the output part 30 is rotatably supported to a tip part of the body section 2, namely a front end side of the hammer case 25. A tip tool is detachably mounted to the anvil 31.

A trigger 5 is disposed to the handle section 3. The trigger 5 is connected to a switch mechanism 6 stored in the handle section 3. The user may turn on and off electric power supplied to the brushless motor 10 by using the trigger 5. A power cord 40 connected to an external alternate current (AC) power source, such as a commercial power source, is drawn out from an outlet 48 at a lower part of the storage section 4. A power box 50 stored in the storage section 4 is connected to a base end side of the power cord 40. A rectifier circuit substrate is disposed in the power box 50. A rectifier circuit converting an alternate current input through the power cord 40 into a direct current (DC) is mounted to the rectifier circuit substrate. In addition, a pair of choke coils 41a and 41b, as noise filter, are stored side by side in the power box 50. The choke coils 41a and 41b are respectively inserted between the power cord 40 and the rectifier circuit (i.e., connected to a power input line of the rectifier circuit). The choke coils 41a and 41b have a core size of 12 mm (outer diameter)×6 mm (inner diameter)×8 mm (width), for example, which is smaller than a core size (e.g., 20 mm (outer diameter)×10 mm (inner diameter)×12 mm (width)) of a conventional ferrite core 41 (FIG. 9). Namely, by replacing the conventional ferrite core 41 with the choke coil, the device may become more compact. Thus, the choke coils 41a and 41b may be stored in the storage section 4 without enlarging the storage section 4.

The storage section 4 further stores a control circuit substrate 60. A control circuit that controls, for example, the rotation of the brushless motor 10 is mounted to the control circuit substrate 60. A pair of film capacitors 42a and 42b (exemplification of non-polar capacitors) configured to remove noise generated from an inverter circuit are mounted to a capacitor substrate 42c and stored side by side in the handle section 3. A predetermined number of rib parts 3a in the handle section 3 position and support the film capacitors 42a and 42b. The film capacitors 42a and 42b may each be a capacitor of 4.7 µF, for example, and are connected in parallel, so as to form a capacitor with a (e.g., 9.4 µF) total capacitance larger than before. As shown in FIG. 3, two lead wires 42d and 42e extend from the capacitor substrate 42c. One end of the lead wire 42d is connected to one ends of the film capacitors 42a and 42b. One end of the other lead wire 42e is connected to the other ends of the film capacitors 42a and 42b. The other ends of the lead wires 42d and 42e are connected to the rectifier circuit in the power box 50.

The inverter circuit controlled by the control circuit is mounted to an inverter circuit substrate (switch element substrate) 70. The inverter circuit substrate 70 is fixed to the body section 2 and behind the brushless motor 10. The inverter circuit has, for example, six insulated gate bipolar transistors (IGBTs) 71 that serve to turn on and off power supply to the brushless motor 10. The respective IGBTs 71 are cooled off with an air flow generated by the cooling fan 15 rotating with the brushless motor 10. The control circuit includes a driving circuit (gate driver) outputting driving signals that turn on and off the respective IGBTs 71 and a microcomputer. A cable 72 electrically connects the control circuit substrate 60 and the inverter circuit substrate 70. In addition, the switch element may be a field-effect transistor (FET).

Figure 4:
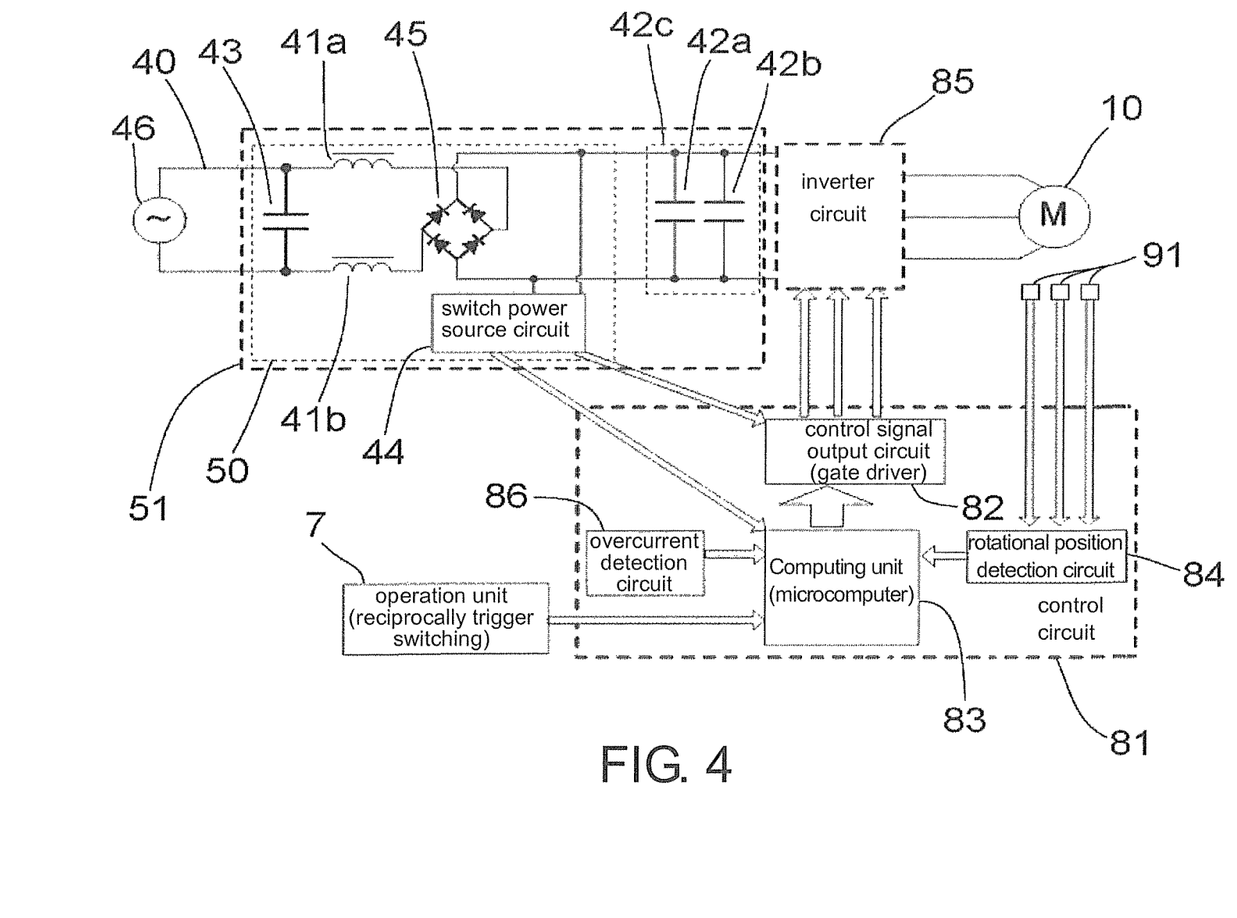
FIG. 4 is a frame view illustrating control of the electric tool shown in FIG. 1.

FIG. 4 is a frame view illustrating control of the electric tool shown in FIG. 1. The power cord 40 is connected to a commercial power source 46. In the power box 50, a diode bridge 45 (exemplification of rectifier circuit) configured to perform full wave rectification for a commercial alternate current power source (e.g., AC 100V in Japan and AC 200V, AC 230V, etc., in other countries) supplied through the power cord 40, the pair of choke coils 41a and 41b and an AC inter-line capacitor 43 forming the noise filter, and a switch power source circuit 44 generating a driving voltage of a control circuit 81 are disposed. The pair of film capacitors 42a and 42b are connected in parallel between output terminals of the diode bridge 45. A circuit in the circuit box 50 and the film capacitors 42a and 42b form a power circuit 51. An output voltage of the diode bridge 45 is input to an inverter circuit 85. The inverter circuit 85 is controlled by the control circuit 81 to drive the brushless motor 10.

The control circuit 81, as a control part, includes: a driving circuit (gate driver) 82 outputting the driving signals that turn on or off IGBTs of the inverter circuit 85; and a microcomputer (computing unit) 83 driving the driving circuit 82. A Hall integrated circuit (Hall IC) 91, as exemplification of rotational position detection element, detects a position of the rotor 12 of the brushless motor 10. For example, three of the Hall integrated circuits 91 are disposed with an interval of 60°. A rotational position detection output of each Hall integrated circuit 91 is input to a rotational position detection circuit 84 of the control circuit 81. An overcurrent detection circuit 86 of the control circuit 81 monitors a driving current of the brushless motor 10. If an overcurrent state is detected, an overcurrent detection signal is input to the microcomputer 83. An output of the switch mechanism 6 operable by using the trigger 5 is also input to the microcomputer 83 (control circuit 81). Besides, in addition to representing the switch mechanism 6, an operation unit 7 shown in FIG. 4 also jointly represents a functional block outputting signals corresponding to operations operable by the user, such as a reciprocally switching button, a striking force switching button switching a rotation speed of the motor, and a switching button for various modes. In the storage section 4 of the housing 1, a light emitting diode (LED) substrate 95 of a display panel 96 exposed on an upper surface side of the housing 1 is stored. Various buttons (e.g., striking force switching button, mode switching button, or the like) available for the user's operation are disposed in the display panel 96. In addition, a striking force and a mode chosen are also displayed. When the switch mechanism 6 operates by using the trigger 5, the control circuit 81 controls the respective IGBTs 71 of the inverter circuit 85 to be turned on or off based on the detection outputs of the respective Hall integrated circuits 91 concerning the position of the rotor, and controls the rotor 12 to rotate in a predetermined direction at a predetermined speed.

Then, an overall operation of the impact driver is described in the following. If the power cord 40 is connected to the commercial power source, the control circuit 81 is supplied with a driving power source. In this state, if an operator pulls the trigger 5, the brushless motor 10 may rotate at a rotation speed corresponding to a degree of pulling. Through rotation of the brushless motor 10, the hammer 21 of the striking mechanism part 20 strikes the anvil 31 of the output part 30. Accordingly, the tip tool maintained by the anvil 31 may rotate. When the operator stops pulling the trigger 5, the brushless motor 10 stops.

With the embodiment, the following effects are achievable.

(1) Since the two film capacitors 42a and 42b are connected in parallel between the output terminals of the diode bridge 45, the capacitance for removing the noise generated from the inverter circuit 85 may be increased than before. Therefore, a noise removal effect is facilitated (increased noise resistance). In addition, a removal effect against noise (surge) transmitted from the side of the power source (AC side) toward the side of the inverter circuit 85 (DC side) is also facilitated because of the increased capacitance.

(2) The total capacitance is increased by connecting the two film capacitors 42a and 42b in parallel. Even though a diameter of the handle section 3 is not increased than before, the film capacitors 42a and 42b may still be stored in the handle section 3. Therefore, it is different from the case where one large-capacitance film capacitor is used. Namely, the capacitance of the noise-suppressing film capacitors is able to be increased even if the diameter of the handle section 3 is not increased.

(3) When the two film capacitors 42a and 42b are mounted to the common capacitor substrate 42c, and the lead wires 42d and 42e extending from the capacitor substrate 42c are respectively connected to the two output terminals of the diode bridge 45, in terms of the completion of wiring of the film capacitors 42a and 42b, the storage of the set of film capacitors and the wiring operation become easier, and the assemblability is facilitated compared with the case where the film capacitors 42a and 42b are abruptly disposed.

(4) The two choke coils 41a and 41b are stored in the power box 50. Therefore, compared with the case where the choke coils 41*a* and 41*b* are disposed outside the power box 50, the wiring operation becomes easier.

(5) Compared with a layout where the choke coils and the film capacitors are close to each other, the layout where the choke coils 41*a* and 41*b* as elements on the AC side and the film capacitors 42*a* and 42*b* as elements on the DC side are physically separated is more desirable in terms of noise suppression, as such layout has smaller mutual noise transmission through a space between the AC side and the DC side. Besides, the small choke coils 42*a* and 41*b* capable of being stored in the power box 50 may also deliver a sufficient noise removal effect.

Embodiment 2

Figure 5:
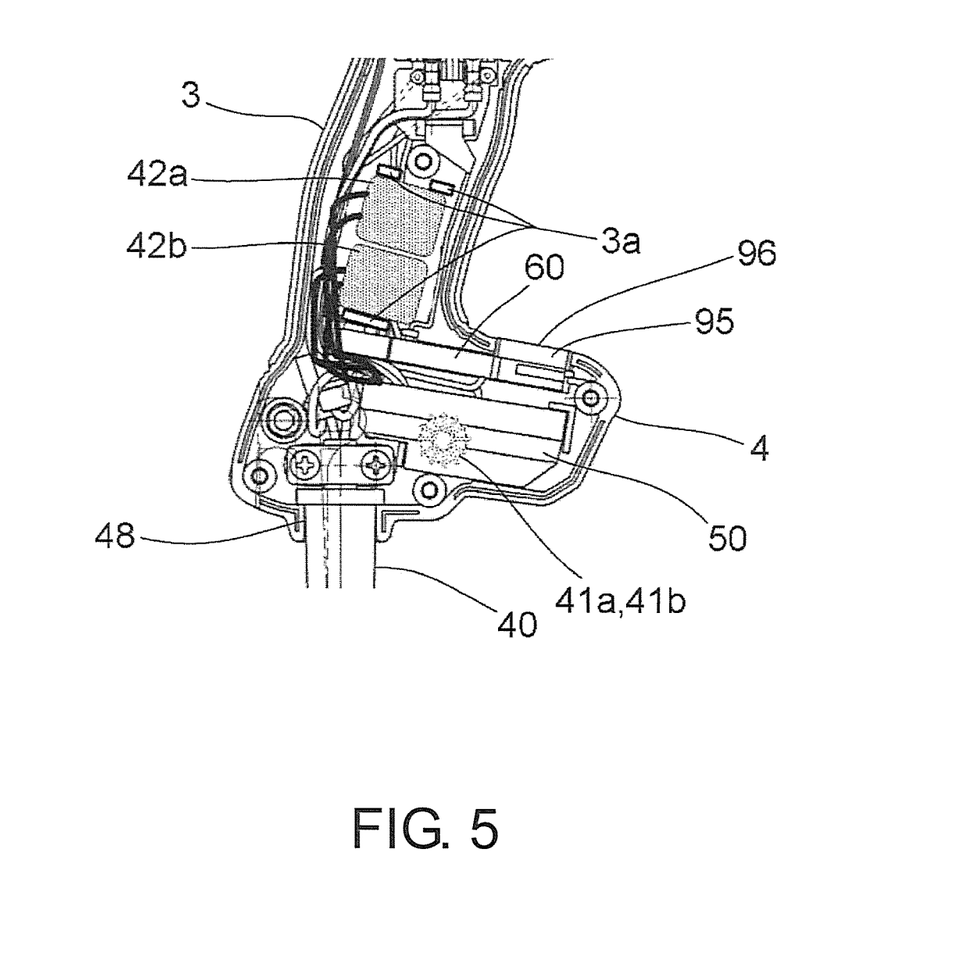
FIG. 5 is a cross-sectional side view illustrating essential parts of an electric tool of Embodiment 2 of the invention.

FIG. 5 is a cross-sectional side view illustrating essential parts of an electric tool of Embodiment 2 of the invention. Compared with the electric tool of Embodiment 1 shown in FIG. 1, the electric tool of this embodiment has differences that are described in the following, and is the same in the rest aspects. Namely, the film capacitors 42*a* and 42*b* are not mounted to the capacitor substrate 42*c*, but are positioned and supported in the handle section 3 by the rib parts 3*a*. Lead wires (four in total) of the film capacitors 42*a* and 42*b* are respectively connected in the power box 50. Except the assemblability, the embodiment is able achieve the same effects as those of Embodiment 1.

Embodiment 3

Figure 6:
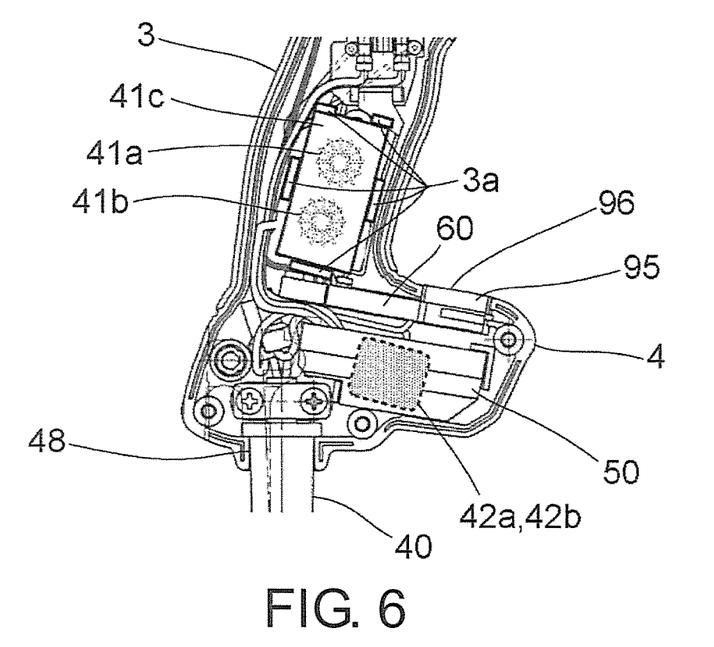
FIG. 6 is a cross-sectional side view illustrating essential parts of an electric tool of Embodiment 3 of the invention.
Figure 7:
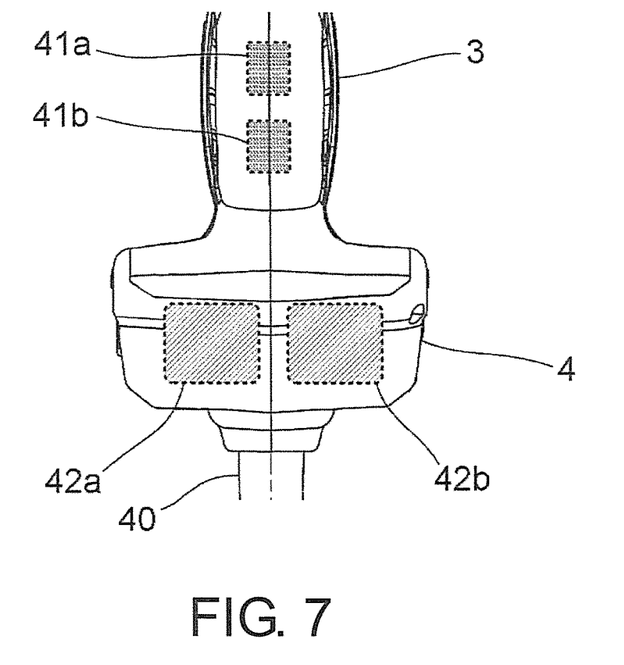
FIG. 7 is a front view of the essential parts of the electric tool shown in FIG. 6 obtained by cutting a portion of the handle section 3.

FIG. 6 is a cross-sectional side view illustrating essential parts of an electric tool of Embodiment 3 of the invention. FIG. 7 is a front view of the essential parts of the electric tool shown in FIG. 6 obtained by cutting a portion of the handle section 3. Compared with the electric tool of Embodiment 1 shown in FIG. 1, the electric tool of this embodiment has differences that are described in the following, and is the same in the rest aspects. Namely, the two film capacitors 42*a* and 42*b* are stored in the power box 50, and the two choke coils 41*a* and 41*b* are mounted to the coil substrate 41*c* and disposed in the handle section 3. The coil substrate 41*c* is positioned and supported in the handle section 3 by the rib parts 3*a*. According to the embodiment, like Embodiment 1, noise resistance is increased than before. In addition, the choke coil is smaller than the film capacitor, making it also possible to further reduce the diameter of the handle section 3. Besides, the choke coils 41*a* and 41*b* may also be not mounted to the coil substrate 41*c*.

Embodiment 4

Figure 8:
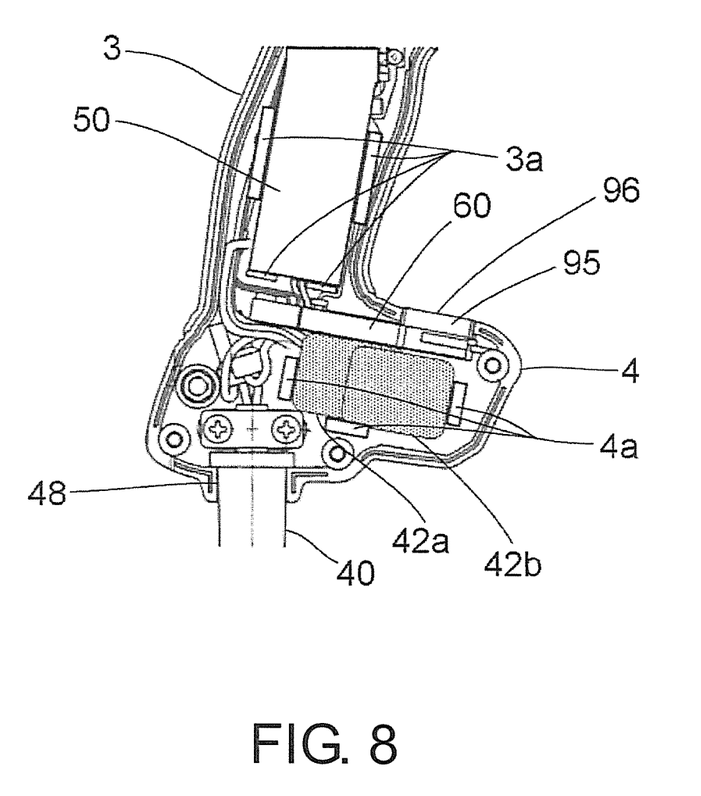
FIG. 8 is a cross-sectional side view illustrating essential parts of an electric tool of Embodiment 4 of the invention.

FIG. 8 is a cross-sectional side view illustrating essential parts of an electric tool of Embodiment 4 of the invention. Compared with the tool of Embodiment 1 shown in the figures such as FIG. 1, the electric tool of this embodiment has differences that are described in the following, and is the same in the rest aspects. Namely, the film capacitors 42*a* and 42*b* are supported by rib parts 4*a* in the storage section 4, and the power box 50 is positioned and supported in the handle section 3 by the rib parts 3*a*. The two choke coils are disposed in the power box 50. The two film capacitors 42*a* and 42*b* may also be mounted to the substrate. According to the embodiment, like Embodiment 1, the diameter of the handle section 3 may be reduced, while the noise resistance may be increased than before.

In view of the foregoing, the invention is described by taking the embodiments as examples. However, people having ordinary skills in the art should understand that various modifications may be made to the respective forming elements or treatment processes of the embodiments within the scope as recited in the claims. In the following, examples of such modifications are described.

In the embodiments, the electric tool is exemplified as an impact driver. However, the invention is applicable as long as an electric tool is mounted with a motor driven by an alternate current power source, and shall not be limited to the impact driver. For example, the electric tool may also be an impact wrench of an impact tool, a driver drill or screw driver having a clutch, a hammer drill having a reciprocal striking mechanism, an oil pulse driver having an oil-pressure striking mechanism part, or the like.

What is claimed is:

1. An electric tool, operable by using power supplied from an alternate current power source, the electric tool comprising:
  a motor;
  an inverter circuit, driving the motor;
  a rectifier circuit, outputting a voltage supplied to the inverter circuit, the rectifier circuit is mounted to a rectifier circuit substrate;
  a power box, enclosing the rectifier circuit substrate;
  two capacitors, connected in parallel between output terminals of the rectifier circuit;
  a capacitor substrate, mounting the two capacitors and connected to the rectifier circuit via two lead wires, wherein the capacitor substrate is provided outside of the power box; and
  a housing forming an outline of the electric tool, and comprises a handle section and a storage section disposed to an end of the handle section,
  wherein the two capacitors are electrically connected in parallel on the capacitor substrate,
  wherein the capacitor substrate is configured to connect with the rectifier circuit substrate via the two lead wires so that the capacitor substrate and the rectifier circuit substrate are separated from each other, and a first direction in which a longitudinal side of the capacitor substrate extends is different from a second direction in which a longitudinal side of the power box extends,
  wherein one of the rectifier circuit substrate and the capacitor substrate is disposed in the storage section, and the other of the rectifier circuit substrate and the capacitor substrate is disposed in the handle section,
  wherein the capacitor substrate is a planar substrate extending in a longitudinal direction of the capacitor substrate, and the longitudinal direction is coinciding with a direction of a gap present in between the two capacitors.

2. The electric tool as claimed in claim 1, wherein:
  the two capacitors are both film capacitors.

3. The electric tool as claimed in claim 1, wherein:
  the two lead wires extend from the capacitor substrate,
  wherein the two lead wires are a first lead wire and a second lead wire respectively having two ends, and each of the two capacitors has a first end and a second end opposite to each other, one of the two ends of the first lead wire is connected to the first ends of the two capacitors, one of the two ends of the second lead wire is connected to the second ends of the two capacitors, and the other one of the two ends of the first lead wire and the other one of the two ends of the second lead wire are connected to the rectifier circuit.

4. The electric tool as claimed in claim 3, wherein the two lead wires are connected to a surface of the capacitor substrate where two capacitors are mounted or the two lead wires are connected between two capacitors.

5. The electric tool as claimed in claim 1, wherein the housing has a body section storing the motor, and the handle section having two ends, wherein one of the two ends is connected to the body section, and the two capacitors and the capacitor substrate are stored in the handle section,
wherein the storage section disposed to the other one of the two ends of the handle section, a power cord is drawn out from the storage section, and the rectifier circuit is stored in the storage section.

6. The electric tool as claimed in claim 5, comprising a plurality of choke coils, wherein the choke coils are respectively disposed to a power input line connected to the rectifier circuit, and the plurality of choke coils are stored in the storage section.

7. The electric tool as claimed in claim 1, wherein the housing has a body section storing the motor, the handle section having two ends, wherein one of the two ends is connected to the body section, and the storage section disposed to the other one of the two ends of the handle section, the two capacitors are stored in the storage section, and choke coils respectively disposed to a power input line connected to the rectifier circuit are stored in the handle section.

8. The electric tool as claimed in claim 1, comprising a storage portion storing two capacitors,
wherein the storage section has a rib part supporting two capacitors or the handle section has a rib part supporting the capacitors.

9. An electric tool, comprising:
a housing comprising
a body section;
a handle section having two ends, which extends downward from the body section, and one end of the handle section connects to the body section; and
storage section, which connects to the other end of the handle section, disposed under the handle section, the storage section has a portion extending forward from the handle section;
a motor, stored in the body section;
an inverter circuit, driving the motor and mounted to an inverter circuit substrate stored in the body section;
a plurality of capacitors, electrically connected in parallel to the inverter circuit; and
a capacitor substrate, mounting the capacitors and electrically connected to the inverter circuit via two lead wires, wherein the capacitor substrate and the inverter circuit substrate are separated from each other, and the capacitor substrate having a short direction which is a thickness direction of the capacitor substrate and a longitudinal direction intersecting to the thickness direction,
wherein the capacitors are electrically connected in parallel on the capacitor substrate,
wherein the capacitor substrate and the capacitors are stored in the handle section so that the longitudinal direction of the capacitor substrate extends along a direction in which the handle section extends, wherein the capacitor substrate is a planar substrate extending in the longitudinal direction of the capacitor substrate, and the capacitors are arranged side by side in a width direction of the capacitors on the capacitor substrate.

10. The electric tool as claimed in claim 9, wherein:
the capacitors are both film capacitors.

11. The electric tool as claimed in claim 9, wherein:
the two lead wires extend from the capacitor substrate, wherein the two lead wires are a first lead wire and a second lead wire respectively having two ends, and each of the capacitors has a first end and a second end opposite to each other, one of the two ends of the first lead wire is connected to the first ends of the capacitors, one of the two ends of the second lead wire is connected to the second ends of the capacitors, and the other one of the two ends of the first lead wire and the other one of the two ends of the second lead wire are connected to the inverter circuit.

12. The electric tool as claimed in claim 11, wherein the two lead wires are connected to a surface of the capacitor substrate where the capacitors are mounted or the two lead wires are connected between the capacitors.

13. The electric tool as claimed in claim 9, the electric tool operable by using power supplied from an alternate current power source, comprising:
a rectifier circuit, outputting a voltage supplied to the inverter circuit, the rectifier circuit is mounted to a rectifier circuit substrate; and
a power box, enclosing the rectifier circuit substrate;
wherein the capacitors connect in parallel between output terminals of the rectifier circuit,
wherein the capacitor substrate connects to the rectifier circuit via two lead wires, the capacitor substrate is outside of the power box,
wherein a power cord is drawn out from the storage section, the motor is stored in the body section stores and the rectifier circuit substrate is stored in the storage section.

14. The electric tool as claimed in claim 13, comprising a plurality of choke coils, wherein the choke coils are respectively disposed to a power input line connected to the rectifier circuit, and the plurality of choke coils are stored in the storage section.

15. The electric tool as claimed in claim 9, wherein the handle section has a rib part supporting the capacitors.

16. An electric tool, comprising:
a housing comprising
a body section;
a connecting section having two ends, which extends from the body section, and one end of the connecting section connects to the body section;
a storage section, which connects to the other end of the connecting section;
a motor, stored in the body section;
a control circuit substrate, stored in the storage section, the control circuit substrate having a short direction which is a thickness direction of the control circuit substrate and a longitudinal direction intersecting to the thickness direction;
an inverter circuit, driving the motor and mounted to an inverter circuit substrate;
a plurality of capacitors, electrically connected in parallel to the inverter circuit; and
a capacitor substrate, mounting the capacitors and electrically connected to the inverter circuit via two lead wires, wherein the capacitor substrate, the inverter circuit substrate and the control circuit substrate are separated from each other, the capacitor substrate having a short direction which is a thickness direction of the capacitor substrate and a longitudinal direction intersecting to the thickness direction of the capacitor substrate,
wherein the capacitors are electrically connected in parallel on the capacitor substrate, wherein the capacitor substrate and the capacitors are stored in the connecting section so that the longitudinal direction of the capacitor substrate extends along a direction in which the connecting section extends, and the longitudinal direction of the capacitor substrate extends in a direction different from the longitudinal direction of the control circuit substrate stored in the storage section, wherein the capacitor substrate is a planar substrate extending in a longitudinal direction of the capacitor substrate, and the capacitors are arranged side by side in a width direction of the capacitors on the capacitor substrate.

17. The electric tool as claimed in claim 16, wherein:
the capacitors are both film capacitors.

18. The electric tool as claimed in claim 16, wherein:
the two lead wires extend from the capacitor substrate,
wherein the two lead wires are a first lead wire and a second lead wire respectively having two ends, and each of the capacitors has a first end and a second end opposite to each other, one of the two ends of the first lead wire is connected to the first ends of the capacitors, one of the two ends of the second lead wire is connected to the second ends of the capacitors, and the other one of the two ends of the first lead wire and the other one of the two ends of the second lead wire are connected to the inverter circuit.

19. The electric tool as claimed in claim 18, wherein the two lead wires are connected to a surface of the capacitor substrate where the capacitors are mounted or the two lead wires are connected between the capacitors.

20. The electric tool as claimed in claim 16,
wherein the handle section has a rib part supporting the capacitors.

* * * * *